Patented Oct. 16, 1923.

1,470,795

UNITED STATES PATENT OFFICE.

EARL H. BABBITT, OF EDGEWATER, COLORADO.

MEDICINAL COMPOUND FOR COWS.

No Drawing. Application filed April 8, 1921. Serial No. 459,722.

*To all whom it may concern:*

Be it known that I, EARL H. BABBITT, a citizen of the United States, residing at Edgewater, in the county of Jefferson and State of Colorado, have invented certain new and useful Improvements in Medicinal Compounds for Cows; and I do declare the following to be a full, clear, and exact description of the invention, such as will enable others skilled in the art to which it appertains to make and use the same.

The object of this invention is to provide a medicinal compound which will serve as a remedy for use in prevention of abortion in cows and which may be administered internally through the mouth. The compound is composed of the following ingredients in the proportions as given: 1 ounce of indigo; ½ ounce of anise oil; 1¼ ounces of carbolic acid, U. S. P.; ¼ ounce of bicarbonate of soda; 11½ ounces of common salt. The amounts thus given produce a total of 14½ ounces of the compound which may conveniently be put up in a single package.

The compound may be used in one of two ways. Where the remedy is to be given to a herd for general preventive purposes, the contents of one 14½ ounce package will be mixed with 60 pounds of salt and dumped out in a trough or other suitable place for ready access by the cows. The presence of the indigo will serve as a mechanical guide to indicate when mixing has been completed, not only in preparing the original compound, but also in mixing with the 60 pounds of salt for use. While the indigo serves conveniently as a mechanical guide in mixing, it also has definite therapeutic value.

Where the remedy is to be applied in a specific aggravated case, one-half teaspoonful of the original mixture as put up in the 14½ ounce package will be dissolved in one quart of water and administered through the mouth as a drench, this being repeated daily for three or four days.

I claim:

1. A medicinal compound for the treatment of contagious abortion in cattle, comprising carbolic acid and indigo.

2. A medicinal compound for the treatment of contagious abortion in cattle, comprising carbolic acid, indigo and sodium chloride.

3. A medicinal compound for the treatment of contagious abortion in cattle, comprising carbolic acid, indigo, sodium chloride, and a bicarbonate.

4. A medicinal compound for the treatment of contagious abortion in cattle, comprising carbolic acid, indigo, sodium chloride, a bicarbonate, and oil of anise.

5. A medicinal compound for the treatment of contagious abortion in cattle, comprising four (4) parts of carbolic acid and five (5) parts of indigo.

6. A medicinal compound for the treatment of contagious abortion in cattle, comprising four (4) parts of carbolic acid, five (5) parts of indigo and one part of bicarbonate of soda.

7. A medicinal compound for the treatment of contagious abortion in cattle, comprising four (4) parts of carbolic acid, five (5) parts of indigo, one (1) part of bicarbonate of soda and two (2) parts oil of anise.

8. A medicinal compound for the treatment of contagious abortion in cattle, comprising four (4) parts of carbolic acid, five (5) parts of indigo, one (1) part of bicarbonate of soda, two (2) parts of oil of anise and forty-five (45) parts of sodium chloride.

In testimony whereof I affix my signature.

EARL H. BABBITT.